United States Patent [19]

Onishi et al.

[11] Patent Number: 4,984,668
[45] Date of Patent: Jan. 15, 1991

[54] ELECTRICALLY-POWERED DRIVE APPARATUS

[75] Inventors: Masayoshi Onishi; Hiromasa Ozawa, both of Hyogo, Japan

[73] Assignee: Mitsubishi Denki Kabushiki Kaisha, Tokyo, Japan

[21] Appl. No.: 374,794

[22] Filed: Jul. 3, 1989

[30] Foreign Application Priority Data

Jul. 4, 1988 [JP] Japan ............................ 63-88939[U]

[51] Int. Cl.⁵ .............................................. F16D 27/10
[52] U.S. Cl. .................................. 192/84 C; 192/67 P; 192/108; 267/161; 335/274
[58] Field of Search ................. 192/84 C, 67 P, 53 R, 192/53 D, 84 R, 108; 335/274; 180/178; 267/161

[56] References Cited

U.S. PATENT DOCUMENTS

| 2,919,775 | 1/1960 | Wiedmann et al. | 192/84 R |
| 3,917,042 | 11/1975 | Summa | 192/108 X |
| 4,132,284 | 1/1979 | Tomecek | 180/179 |
| 4,367,805 | 1/1983 | Totani et al. | 180/179 |
| 4,815,553 | 3/1989 | Onishi et al. | 180/178 |
| 4,823,902 | 4/1989 | Onishi et al. | 180/170 |

Primary Examiner—Richard Lorence
Attorney, Agent, or Firm—Sughrue, Mion, Zinn, Macpeak & Seas

[57] ABSTRACT

An electrically powered drive apparatus comprises a first clutch plate secured to an output shaft and a second clutch plate mounted to a gear which is rotatably and slidably provided on the output shaft. The second clutch plate comprises a resilient transmission member and a magnetically-attracted contact member. The resilient transmission member is secured at a first portion to the gear and is adapted to resiliently deflect. The contact member is secured to a second portion of the resilient transmission member. The resilient transmission member has teeth into which pins extend in meshing engagement. When a clutch coil is energized, the contact member is attracted by the first clutch plate to thereby cause the pins to engage the teeth, thereby transmitting rotational force from the drive source to the gear. When the clutch coil is de-energized, the contact member is released to return to its home position with the aid of the resiliency of the resilient transmission member.

1 Claim, 3 Drawing Sheets

PRIOR ART

ELECTRICALLY-POWERED DRIVE APPARATUS

BACKGROUND OF THE INVENTION

1. Field of the Invention

The present invention relates to an electrically powered drive apparatus for controlling, for example, the opening of the throttle valve of a vehicle and more particularly to a clutch apparatus incorporated in the electrically powered drive apparatus.

2. Prior Art

FIG. 3 and FIGS. 4A-4B illustrate an electrically powered drive apparatus disclosed by Japanese Patent KOKAI No. 62-203766. FIG. 3 shows a cross-sectional view of the apparatus and FIG. 4A and FIG. 4B show enlarged fragmentary views of the clutch apparatus 11. The electrically powered drive apparatus is mounted to a mounting plate 26. A rotary lever 16 is secured to an output shaft 10. An external load-driving wire 18 is disposed at its one end about the rotary lever 16 and extends at its other end to for example a throttle valve (not shown). The rotary lever 16 is basically formed by a circular member having a groove for receiving the wire 18 on its external circumference. The reference numerals 3, 4, 5, 6 and 7 denote a train of reduction gears. When the clutch 11 engages, the rotary lever 16 winds up or releases the wire 18 depending on the direction of rotation of a motor 1. The reference numeral 14 denotes a clutch yoke. One of the clutch plates 13 is secured to the output shaft 10, while the other clutch plate 8 is mounted on a gear 7 which is loosely fitted on the output shaft 10.

A plurality of pins 12 are provided on the clutch plate 13. When a clutch coil 15 is energized, the ferrite clutch plate 8 is attracted as shown in FIG. 4B, to cause a plurality of pins 12 to engage with a plurality of teeth 8a, thereby transmitting the drive force of the gear 7 to the output shaft 10. A return spring 9 ensures that the clutch plate 8 disengages from the mating clutch plate 13 when the clutch coil 15 is de-energized.

When the motor 1 is operated, the clutch plate 8 is rotated by the motor 1 through the train of the reduction gears 3-7. If the clutch apparatus 11 is in the OFF position, then the motor torque is not transmitted to the output shaft 10. When the clutch apparatus 11 is in the ON position, that is, when the clutch coil 15 is energized, the clutch plate 8 engages the clutch plate 13 to transmit the motor torque to the output shaft. The clutch apparatus 11 of such a prior art electrically powered drive apparatus may be operated, in some cases, to engage or disengage with the motor 1 being operated; therefore the clutch plate 8 that has a plurality of teeth 8a must have good mechanical strength so that it can withstand a large impact when the pins 12 are driven into engagement with or disengagement from the teeth 8a. In the mean time, the ferrite clutch plate 8, as a magnetic member, must be suitably attracted by the clutch coil 15 for sure clutch engagement.

Conventionally, the ferrite clutch plate 8 is made of a ferrite material which is quenched through cementation for increased mechanical strength, and the thickness of the clutch plate 8 is increased to compensate for a decrease in magnetic efficiency due to the quenching to thereby maintain a sufficient amount of effective magnetic flux therethrough. Thus, when manufacturing the clutch plate through pressing, a large deformation will result, particularly at an edge portion thereof, which necessitates the pins 12 to fit the teeth 8a, across the entire thickness of the member to ensure an effective fitting length of the pin 12 into the tooth 8a. This causes a large gap between the clutch plate 8 and the clutch coil 15, leading to a bulky, large size of the clutch coil 15. The prior art, thus described, is necessarily of a large size.

SUMMARY OF THE INVENTION

An object of the present invention is to provide a reliable electrically powered drive apparatus which is small in size.

The clutch plate 8 of the drive apparatus according to the present invention is constructed of a thin member having good mechanical strength and good magnetic properties. The teeth 8a are not formed on the magnetic member but on the thin mechanically strong member to which the magnetic member is stacked.

The present invention provides a clutch apparatus for an electrically powered drive apparatus, the driving apparatus having an output shaft which is engageable with a drive source, through the clutch apparatus According to the present invention, the clutch apparatus comprises:

a first clutch plate coaxially secured to the output shaft and having a pin thereon at a portion apart from the output shaft, the pin projecting into the axial direction of the output shaft, the first clutch plate being magnetized when a clutch coil is energized;

a gear rotatably loosely mounted to the output shaft oppositely to the clutch plate, the gear being rotatable relative to the output shaft;

a second clutch plate connected to the gear and adapted to be attracted by the first clutch plate and to be driven by the first clutch plate; wherein the second clutch plate comprises;

a resilient transmission member secured at a first portion thereof to the gear, the resilient transmission member being adapted to resiliently deflect, the resilient transmission member having teeth into which the pin extends in meshing engagement when the second clutch plate is attracted by the first clutch plate; and a magnetically-attracted contact member secured to a second portion of the resilient transmission member, the contact member being attracted by the first clutch plate to thereby cause the pin to engage the teeth to transmit rotational force from the gear to said output shaft when the clutch coil is energized, the contact member being released to thereby return with the aid of the resiliency of the resilient transmission member.

BRIEF DESCRIPTION OF THE DRAWINGS

Features and details of the invention will be apparent from the following description of a specific embodiment with reference to the accompanying drawings in which.

DESCRIPTION OF PREFERRED EMBODIMENTS

Figure 3:
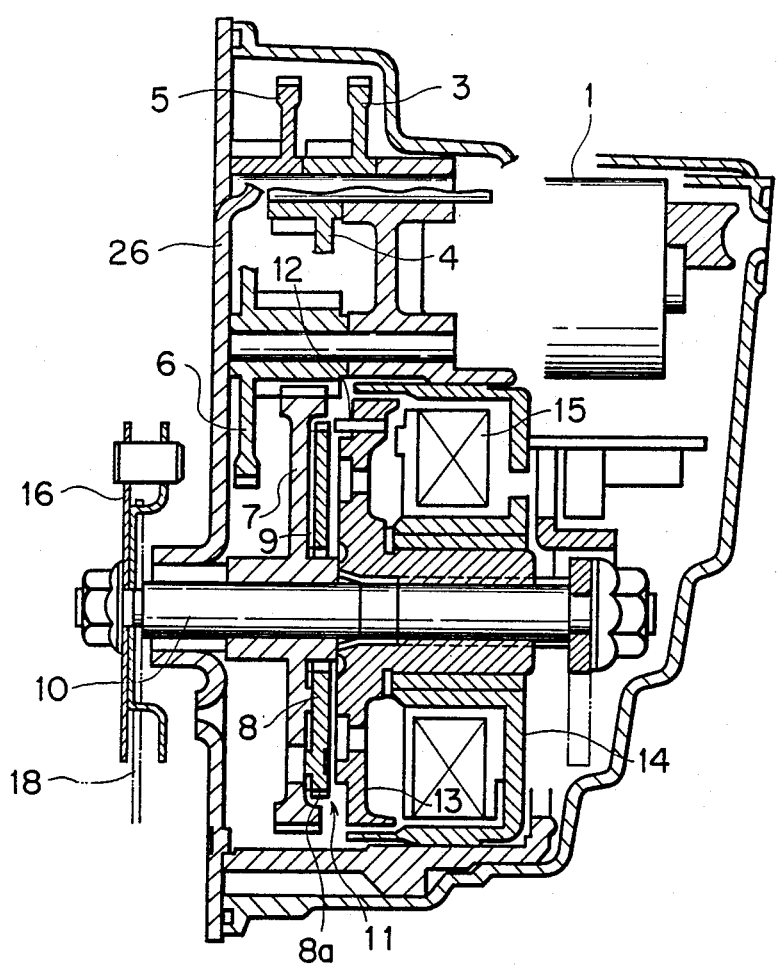
FIG. 3 is a cross-sectional view for showing a prior art electrically powered drive apparatus.
Figure 4A:
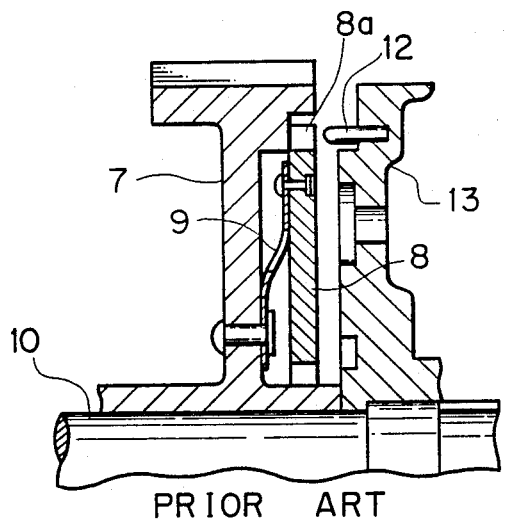
FIG. 4A and FIG. 4B are cross-sectional views of the clutch of the prior art apparatus in two operating states of the clutch mechanism.
Figure 4B:
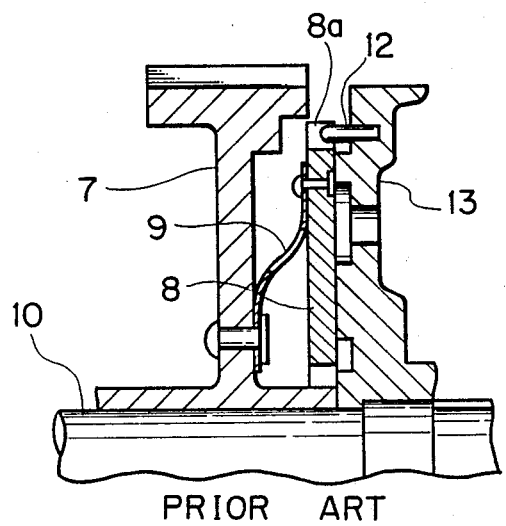

A preferred embodiment of an electrically powered drive apparatus according to the present invention will now be described with reference to FIG. 1A, FIG. 1B, FIG. 2A, and FIG. 2B. These Figures show only the clutch portion of the electrically powered drive apparatus and the remaining portions of the apparatus are the same as those of the prior art apparatus in FIG. 3 and FIGS. 4A-4B.

The clutch mechanism includes a clutch plate 13 secured to an output shaft 10 and a clutch plate 8 which is formed of a resilient transmission member or plate 80 and a magnetically-attracted contact member 81. The output shaft 10 is connected to a rotary lever 16 and extends through the center hole of the resilient transmission plate 80 and the contact member 81. The transmission member 80 is made of, for example, a spring steel plate having good resiliency and is formed with a plurality of teeth 8a on its circumference.

The magneticaly-attracted contact member 81 is made of a thin disc-like plate of a magnetic material having a small magnetic resistance. The transmission member 80 is secured to the contact member 81 through a calking pin 82 which extends through holes 84, 85. The head of the calking pin 82 projects into a hole 86 provided in a gear 7. The gear 7 is rotatable relative to the output shaft 10. The transmission member 80 is secured at its one end to the gear 7 by means of a caulking pin 83 through holes 90, which are 120 degrees apart. The calking pin 83 extends through a hole 87 so that it does not exert any deformable force to the contact member 81. The transmission member 80 is provided with holes 88 therein to form deflecting connection portions 89. The transmission member 80 deflects against the resiliency of the deflection connection portions 89, as shown in FIG. 1B, when the contact member 81 is magnetically attracted by the clutch plate 13. This causes the pins 12 provided on the clutch plate 13 to engage the teeth 8a in meshing relation. Thus, the clutch plate 13 transmits the rotational force of the gear 7 to the output shaft 10 through the meshing engagement between the pins 12 and the teeth 8a when the gear 7 is driven by the motor 1.

Figure 1A:
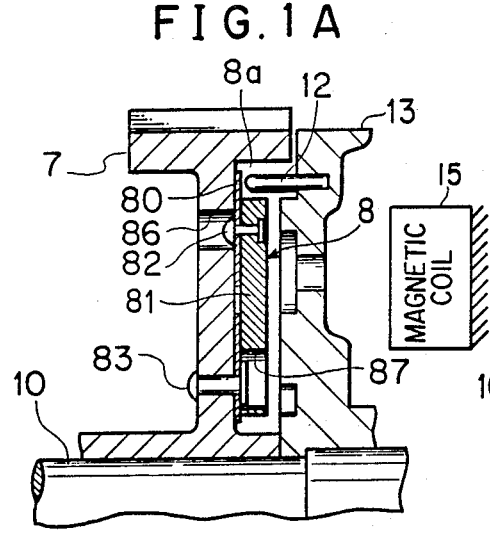
FIG. 1A and FIG. 1B are cross-sectional views of major portions of the invention in two operating states, i.e., engagement and disengagement, of a clutch mechanism according to the present invention.
Figure 1B:
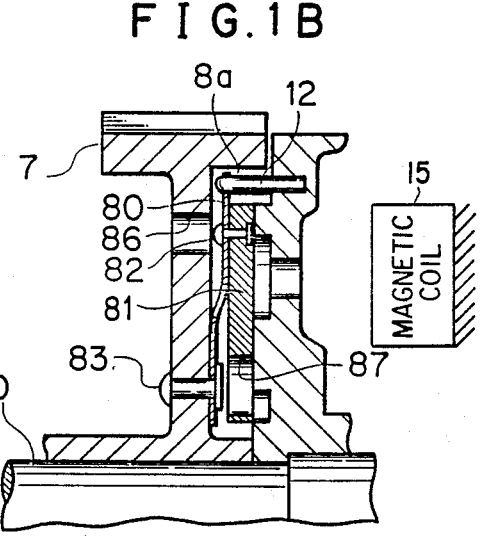
Figure 2A:
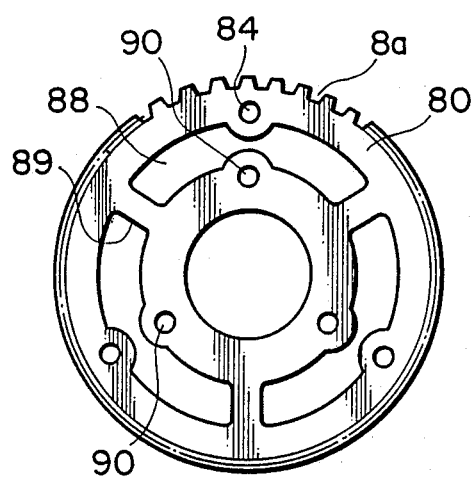
FIG. 2A and FIG. 2B are top views showing a resilient transmission member and a magnetically-attracted contact member.
Figure 2B:
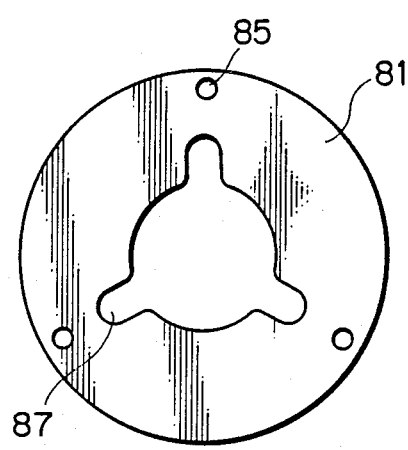

The transmission member 80 returns to its home position with the aid of the resiliency of the poritions 89, as shown in FIG. 1A, when the clutch coil 15 is de-energized. That is, the deflecting connection member 89 serves as the return spring 9 of the prior art apparatus. With the above-described structure, the transmission member 80 carries the rotational drive force and serves as a return spring, while the contact member 81 merely serves to cause the resilient transmission member to deflect so that the teeth 8a move into meshing relation with the pins 12. It should be noted that no mechanical load or rotational force is exerted on the contact member 81. Thus, the contact member is not required to be mechanically strong.

The surface of the spring steel plate forming the transmission member 80 is quenched through cementation to have sufficient abrasion property; therefore even through it is thin, it is strong enough to transmit a required torque when engaged with the pins 12. The thin, resilient transmission member 80 requires only a deflection distance of, for example, 1.1 mm for the clutch mechanism to establish engagement or disengagement thereof. This also reduces the required distance between the contact member 81 and the clutch plate 13, thus allowing the clutch coil 15 to be small in size. A wide variety of magnetic materials are available for the contact member 81, facilitating the reduction of the thickness of the contact member 81.

What is claimed is:

1. A clutch apparatus for an electrically powered drive apparatus, the drive apparatus having an output shaft which is engageable with a drive source through said clutch apparatus, said clutch apparatus comprising:
    a first clutch plate coaxially secured to said output shaft and having a plurality of pins thereon, said pins projecting in the axial direction of said output shaft, said first clutch plate having a clutch coil associated therewith and being magnetized when said clutch coil is energized;
    a gear loosely mounted to said output shaft oppositely to said clutch plate, said gear being rotatable relative to said output shaft;
    a second clutch plate connected to said gear and adapted to be attracted by said first clutch plate and to be driven by said first clutch plate, wherein said second clutch plate comprises;
    a resilient transmission member secured at a first portion thereof to said resilient gear, said resilient transmission member being adapted to resiliently deflect, said resilient transmission member having teeth into which said pins extend in meshing engagement when said second clutch plate is attracted by said first clutch plate; and
    a magnetically-attracted contact member secured to a second portion of said resilient transmission member, said contact member being attracted by said first clutch plate to thereby cause said pins to engage said teeth to transmit rotational force from said gear to said output shaft when said clutch coil is energized, said contact member being released to thereby return with the aid of the resiliency of said resilient transmission member.

* * * * *